(12) United States Patent
Holt

(10) Patent No.: US 7,581,069 B2
(45) Date of Patent: Aug. 25, 2009

(54) MULTIPLE COMPUTER SYSTEM WITH ENHANCED MEMORY CLEAN UP

(75) Inventor: John Matthew Holt, Hornchurch (GB)

(73) Assignee: Waratek Pty Ltd. (AU)

( * ) Notice: Subject to any disclaimer, the term of this patent is extended or adjusted under 35 U.S.C. 154(b) by 485 days.

(21) Appl. No.: 11/583,991

(22) Filed: Oct. 18, 2006

(65) Prior Publication Data

US 2007/0100918 A1    May 3, 2007

Related U.S. Application Data

(60) Provisional application No. 60/730,408, filed on Oct. 25, 2005.

(51) Int. Cl.
*G06F 12/00*    (2006.01)
(52) U.S. Cl. .................. 711/147; 711/141; 711/161; 711/170; 707/206; 714/48
(58) Field of Classification Search .............. 711/141, 711/147, 161, 166, 170; 707/206; 709/216; 714/48
See application file for complete search history.

(56) References Cited

U.S. PATENT DOCUMENTS

| | | | |
|---|---|---|---|
| 5,214,776 A | 5/1993 | Bagnoli et al. | |
| 5,434,994 A | 7/1995 | Shaheen et al. | |
| 5,488,723 A | 1/1996 | Baradel et al. | |
| 5,544,345 A * | 8/1996 | Carpenter et al. | 711/150 |
| 5,918,248 A | 6/1999 | Newell et al. | |
| 6,049,809 A | 4/2000 | Raman et al. | |
| 6,163,801 A | 12/2000 | O'Donnell et al. | |
| 6,192,514 B1 | 2/2001 | Lurndal | |

(Continued)

FOREIGN PATENT DOCUMENTS

WO        WO02/44835        6/2002

(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner*—Reba I Elmore
(74) *Attorney, Agent, or Firm*—Perkins Coie, LLP

(57) ABSTRACT

The updating of only some memory locations in a multiple computer environment in which at least one applications program (50) executes simultaneously on a plurality of computers M1, M2 . . . . Mn each of which has a local memory, is disclosed. Memory locations (A, B, D, E, X) in said local memory are categorized into two groups. The first group of memory locations (X1, X2, . . . Xn, A1, A2, . . . An) are each accessible by other computers. The second group of memory locations (B, E) are each accessible only by the computer having the local memory including the memory location. Changes to the contents of memory locations in the first group only are transmitted to all other computers. A demotion mechanism is disclosed to demote memory locations in the first group into the second group in the event that application program execution means that a memory location in said first group is no longer referenced by another memory location in another computer.

14 Claims, 10 Drawing Sheets

U.S. PATENT DOCUMENTS

| | | | |
|---|---|---|---|
| 6,327,630 B1 | 12/2001 | Carroll et al. | |
| 6,370,625 B1 | 4/2002 | Carmean et al. | |
| 6,389,423 B1 | 5/2002 | Sakakura | |
| 6,425,016 B1 | 7/2002 | Banavar et al. | |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,625,751 B1 | 9/2003 | Starovic et al. | |
| 6,668,260 B2 | 12/2003 | Zoltan | |
| 6,757,896 B1 | 6/2004 | Cohen et al. | |
| 6,775,831 B1 | 8/2004 | Carrasco et al. | |
| 6,968,372 B1 | 11/2005 | Thompson et al. | |
| 7,010,576 B2 | 3/2006 | Bae | |
| 7,020,736 B1 | 3/2006 | Cherukuri | |
| 7,031,989 B2 | 4/2006 | Elmendorf et al. | |
| 7,047,341 B2 | 5/2006 | Jung | |
| 7,082,604 B2 | 7/2006 | Schneiderman | |
| 2003/0067912 A1* | 4/2003 | Mead et al. | 370/389 |
| 2004/0073828 A1 | 4/2004 | Bronstein | |
| 2006/0242464 A1 | 10/2006 | Holt | |
| 2006/0253844 A1 | 11/2006 | Holt | |
| 2006/0265703 A1 | 11/2006 | Holt | |
| 2006/0265704 A1 | 11/2006 | Holt | |
| 2006/0265705 A1 | 11/2006 | Holt | |

FOREIGN PATENT DOCUMENTS

| | | |
|---|---|---|
| WO | WO03/083614 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal et al., "Experience with Distributed Programming in Orca", *Proc. IEEE CS International Conference on Computer Languages*, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems",*IEEE Transactions on Software Engineering*, 18(3):190-205 (2002).

Bal et al., "Replication Techniques for Speeding up Parallel Applications on Distributed Sysytems", *Concurrency Practice & Experience*, 4(5):337-355 (1992).

Bressoud, T.C. TFT: "A Software System for Application-Transparent Fault Tolerance. Proc.", 28th Annual International Symposium on Fault-Tolerant Computing, pp. 128-137 (1998).

\* cited by examiner

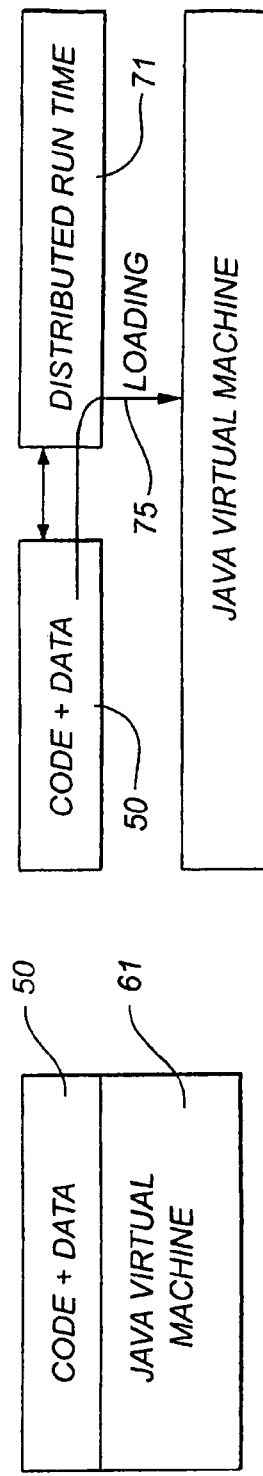
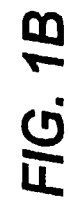
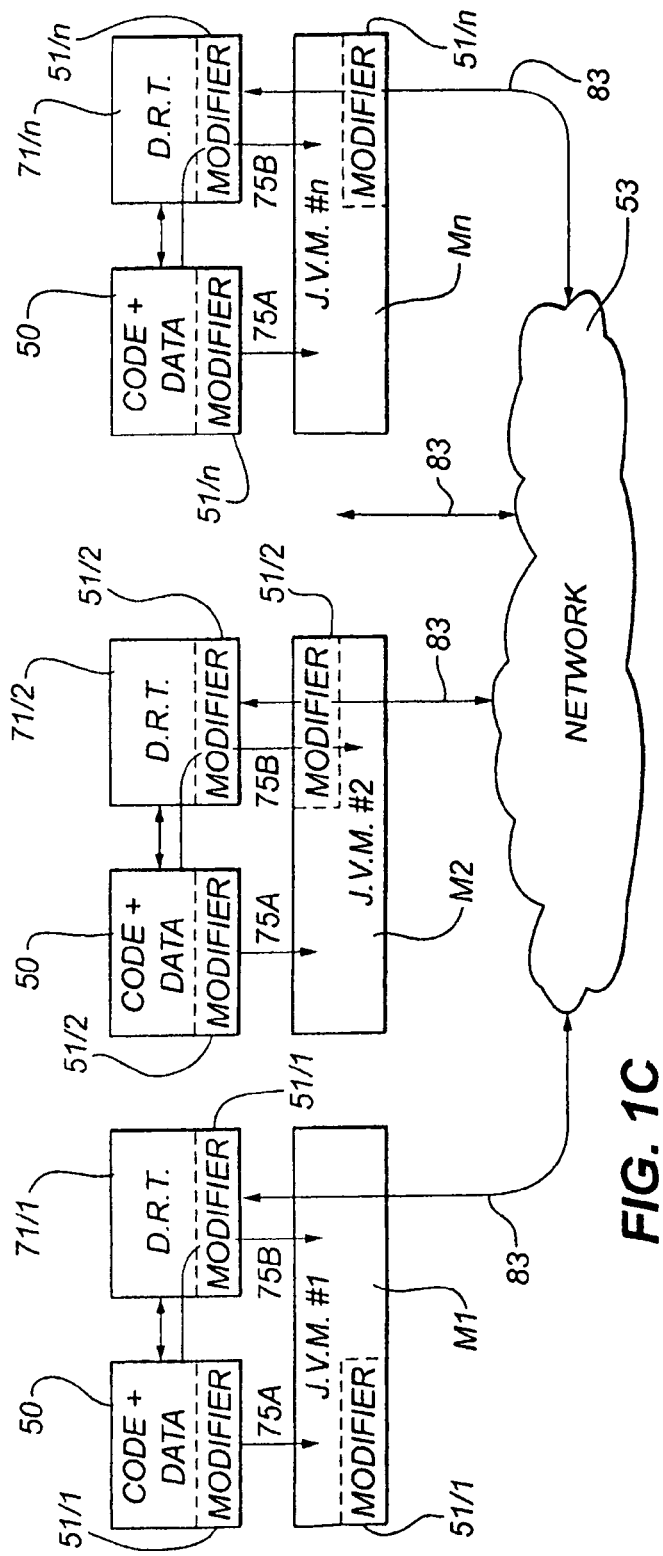
FIG. 1A PRIOR ART
FIG. 1B
FIG. 1C

| LOCATION | MACHINE | | | | | |
|---|---|---|---|---|---|---|
| A | 1 | 2 | | | --- | n |
| B | 1 | | | | --- | |
| ⋮ | | | | | --- | |
| D | | 2 | | | --- | |
| E | | | | | --- | n |
| | | | | | --- | |
| | | | | | --- | |
| | | | | | --- | |
| X | 1 | 2 | | | --- | n |

MACHINE | TABLE

| X1 | 1 | 2 |  |  | n |
|---|---|---|---|---|---|
| A1 | 1 | 2 |  |  | n |
| B | 1 |  |  |  |  |
|  |  |  |  |  |  |

M1

| X2 | 1 | 2 |  |  | n |
|---|---|---|---|---|---|
| A2 | 1 | 2 |  |  | n |
| D |  | 2 |  |  |  |
|  |  |  |  |  |  |

M2

| Xn | 1 | 2 |  |  | n |
|---|---|---|---|---|---|
| An | 1 | 2 |  |  | n |
| E |  |  |  |  | n |
|  |  |  |  |  |  |

| LOCATION | MACHINE | | | | | |
|---|---|---|---|---|---|---|
| A | 1 | 2 | | | | n |
| B | 1 | | | | | |
| ⋮ | | | | | | |
| D | | 2 | | | | |
| E | | | | | | n |
| | | | | | | |
| | | | | | | |
| | | | | | | |
| X | 1 | 2 | | | | n |

MACHINE                    TABLE

| X1 | 1 | 2 |  |  | n |
|----|---|---|---|---|---|
| A1 | 1 | 2 |  |  | n |
| B  | 1 |   |   |   |   |
|    |   |   |   |   |   |

M1

| X2 | 1 | 2 |  |  | n |
|----|---|---|---|---|---|
| A2 | 1 | 2 |  |  | n |
| D  |   | 2 |   |   |   |
|    |   |   |   |   |   |

M2

| Xn | 1 | 2 |  |  | n |
|----|---|---|---|---|---|
| An | 1 | 2 |  |  | n |
| E  |   |   |   |   | n |
|    |   |   |   |   |   |

MACHINE | TABLE

M1

| X1 | 1 | 2 |   |   | n |
|----|---|---|---|---|---|
| A1 | 1 | 2 |   |   |   |
| B  | 1 |   |   |   |   |
|    |   |   |   |   |   |

M2

| X2 | 1 | 2 |   |   | n |
|----|---|---|---|---|---|
| A2 | 1 | 2 |   |   |   |
| D  |   | 2 |   |   |   |
|    |   |   |   |   |   |

Mn

| Xn | 1 | 2 |   |   | n |
|----|---|---|---|---|---|
| E  |   |   |   |   | n |
|    |   |   |   |   |   |
|    |   |   |   |   |   |

FIG. 11

MACHINE　　　　　　　　　　TABLE

| X1 | 1 | 2 |   |   | n |
|----|---|---|---|---|---|
| A  | 1 |   |   |   |   |
| B  | 1 |   |   |   |   |
|    |   |   |   |   |   |

M1

| X2 | 1 | 2 |   |   | n |
|----|---|---|---|---|---|
| D  |   | 2 |   |   |   |
|    |   |   |   |   |   |
|    |   |   |   |   |   |

M2

| Xn | 1 | 2 |   |   | n |
|----|---|---|---|---|---|
| E  |   |   |   |   | n |
|    |   |   |   |   |   |
|    |   |   |   |   |   |

MULTIPLE COMPUTER SYSTEM WITH ENHANCED MEMORY CLEAN UP

CROSS-REFERENCE TO RELATED APPLICATIONS

This specification claims benefit of previously filed U.S. Provisional Application No. 60/730,408 entitled "Multiple Computer System with Enhanced Memory Clean Up" filed 25 Oct. 2005; which is hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The abovementioned incorporated by reference specifications disclose that clean up of all corresponding memory locations is delayed until all computers have ceased to access a specific memory location. Once the last computer no longer requires access to the specific local memory location, then that local memory location can be cleaned-up (or reclaimed) and so too can all corresponding memory locations on all other machines.

The genesis of the present invention is a desire to accelerate clean up or reclamation of local memory locations in the multiple computer system thereby permitting such memory locations to be sooner re-allocated to future tasks.

SUMMARY OF THE INVENTION

In accordance with a first aspect of the present invention there is disclosed a method of disabling a local memory clean-up procedure inherently present in each of a plurality of computers each with their corresponding independent local memory, each substantially simultaneously executing a corresponding different portion of an application program written to execute on only a single computer, and each being connected via a communications network to permit updating of corresponding memory locations, said method comprising the steps of:

(i) categorizing the memory locations of said local memories into a first reachability category in which the local memory locations are replicated on selected ones, or all, of said computers and therefore require updating via said communications network with changes to corresponding memory locations of the other computers having access to maintain substantial memory coherence, and into a second category in which the local memory locations are present only in the local computer and therefore no updating is required, (ii) permitting said inherent local memory clean-up procedure to operate unfettered in respect of said second category memory locations, (iii) disabling said inherent local memory clean-up procedure in respect of said first category memory locations, and (iv) demoting from said first category to said second category any of said first category memory locations unable to be referenced by any of said computers other than the local computer having said demotable first category memory location.

In accordance with a second aspect of the present invention there is disclosed a clean-up procedure modified multiple computer system in which a plurality of computers each has their corresponding independent local memory, each has an inherent local memory clean-up procedure, each substantially simultaneously executes a corresponding different portion of an application program written to execute on only a single computer, and each is connected via a communications network to permit updating of corresponding memory locations, said system including a reachability means to categorize memory locations of said local memories into a first category in which the local memory locations are replicated on selected ones, or all, of said computers and therefore require updating via said communications network with changes to corresponding memory locations of other computers to maintain substantial memory coherence, and into a second category in which the local memory locations are present only in the local computer and therefore no updating is required, and wherein said system includes a disabling means connected to said reachability means and to each of said plurality of computers to disable said inherent local memory clean-up procedure in respect of memory locations in said first category only, and said reachability means includes a demoting means to demote from said first category to said second category any of said first category memory locations unable to be referenced by any of said computers other than the local computer having said demotable first category memory location.

In accordance with a third aspect of the present invention there is disclosed a single computer adapted to co-operate with at least one other computer in order to carry out the above method or form the above system.

In accordance with a fourth aspect of the present invention there is disclosed a computer program product comprising a set of program instructions stored in a storage medium and operable to permit a plurality of computers to carry out the above method.

In accordance with a fifth aspect of the present invention there is disclosed a plurality of computers interconnected via a communications network and operable to ensure carrying out of the above method.

BRIEF DESCRIPTION OF THE DRAWINGS

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server, FIG. 5 shows multiple reachability tables corresponding to the single table of FIG. 4, FIG. 8 shows the multiple reachability tables corresponding to FIG. 7.

DETAILED DESCRIPTION

Figure 2:
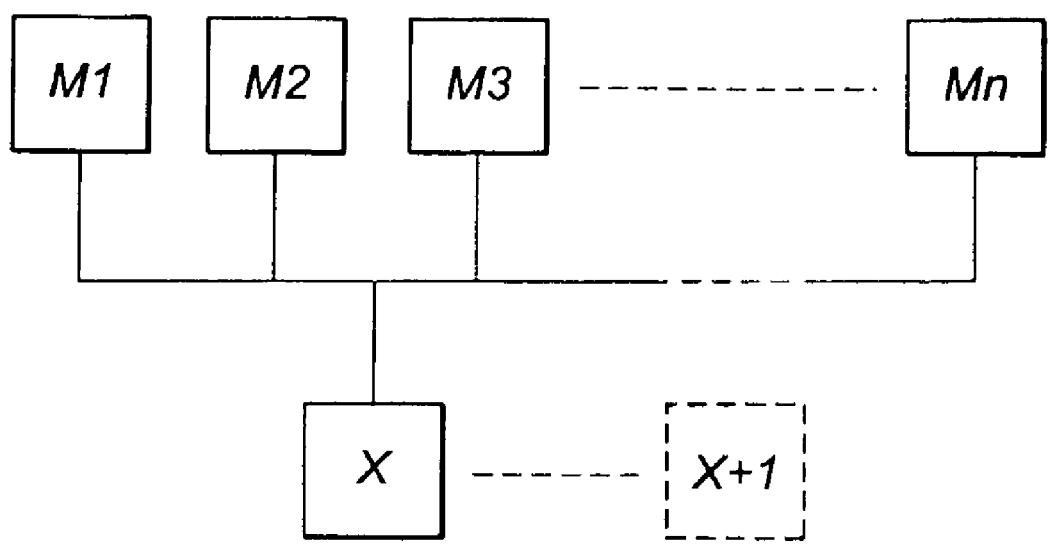

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2 . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1, ... 71/n within each machine. Thus, in practice this may be conceptionalised as the DRT's 71/1, ... 71/n communicating with each other via the network or other communications link 53 rather than the machines M1, M2 ... Mn communicating directly themselves or with each other. Contemplated and included are either this direct communication between machines M1, M2 ... Mn or DRT's 71/1, 71/2 ... 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 ... Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 ... Mn, or optionally on each one of some subset of the plurality of computers or machines M1, M2 ... Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M, M2 ... Mn and thus all of the machines M1, M2 ... Mn have the same or substantially the same application code 50, usually with a modification that may be machine specific.

Before the loading of, or during the loading of, or at any time preceding the execution of, the application code 50 (or the relevant portion thereof) on each machine M1, M2 ... Mn, each application code 50 is modified by a corresponding modifier 51 according to the same rules (or substantially the same rules since minor optimizing changes are permitted within each modifier 51/1, 51/2 . . . 51/n). Each of the machines M1, M2 ... Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 ... Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 ... Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, ..., Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 ... Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 ... Mn has a private (i.e. 'non-common') internal memory capability. The private internal memory capability of the machines M1, M2, ..., Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, ..., Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 ... Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.ClassLoader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

In connection with the above, it will be seen from FIG. 2 that there are a number of machines M1, M2, .... Mn, "n" being an integer greater than or equal to two, on which the application program 50 of FIG. 1 is being run substantially simultaneously. These machines are allocated a number 1, 2, 3, ... etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However this would result in generally undesirable complexity. If the machine X is not provided then its functions, such as housekeeping functions, are provided by one, or some, or all of the other machines.

Figures 3, 4:
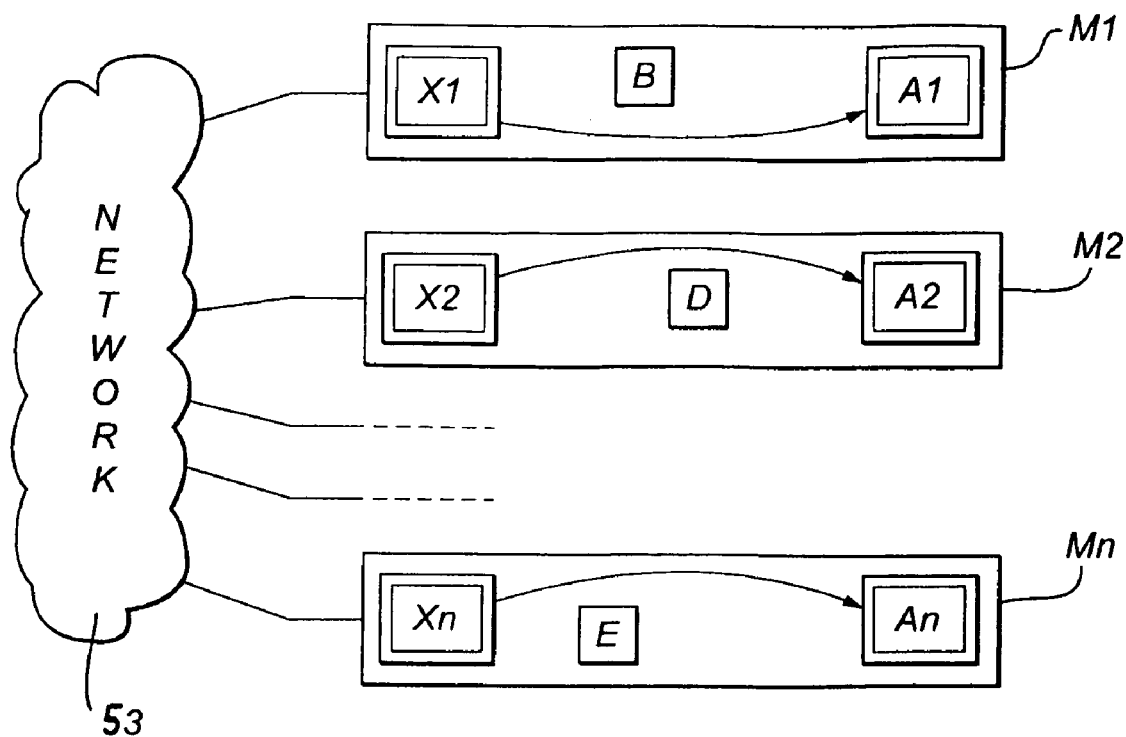
FIG. 3 is a schematic map of the memory locations in all the multiple machines showing memory locations including classes and objects.
FIG. 4 is a single reachability table showing the various memory locations of FIG. 3 and their ability to be reached.

Turning now to FIG. 3, each of the multiple machines M1, M2 ... Mn (other than any server machine X if present) has its memory locations schematically illustrated. For machine M1 there is a class X1 and objects A1 and B. For machine M2 there is a class X2 (which is the same as class X1 in machine M1), and objects A2 and D. Object A2 in machine M2 is the same as object A1 in machine M1. For machine Mn there is a class Xn and objects An and E. Class Xn and object An are the same as classes X1 and X2 and objects A1 and A2 respectively. Since each of the machines M1, M2 and Mn is able to both read from, and write to, memory locations X and A, the boundary of each of these memory locations is indicated with a double line.

Preferably, it is convenient for the server machine X of FIG. 2, to maintain a table listing each memory location and the machines which are able to access each memory location in the table. Such a table is said to be a reachability table and is illustrated in FIG. 4. The first row in the table of FIG. 4 deals with memory location A which is able to be accessed by machines M1, M2 and Mn. The second row in the table of FIG. 4 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

A single reachability table can be provided which is located in, and maintained by, the server machine X. However, it is also possible for the computer system to be operated without a server machine X in which case it is desirable for each machine to operate its own reachability table. FIG. 5 illustrates individual reachability tables for the individual machines in the circumstances corresponding to FIG. 4.

In the multi-machine environment described above, in the event that the content of class X or object A is changed by being written to by one of the machines, then it is necessary to transmit that change via the network 53 to all the other machines. However, as the objects B, D and E are each only able to be accessed by a single machine, there is little point in either creating or updating the contents of these memory locations since they are only able to be accessed by their local machine.

As the class X needs to refer to the object A, then class X is said to point to object A. This is indicated in FIG. 3 by an arrow pointing from classes X1, X2 and Xn to objects A1, A2 and An respectively.

Figures 6, 7:
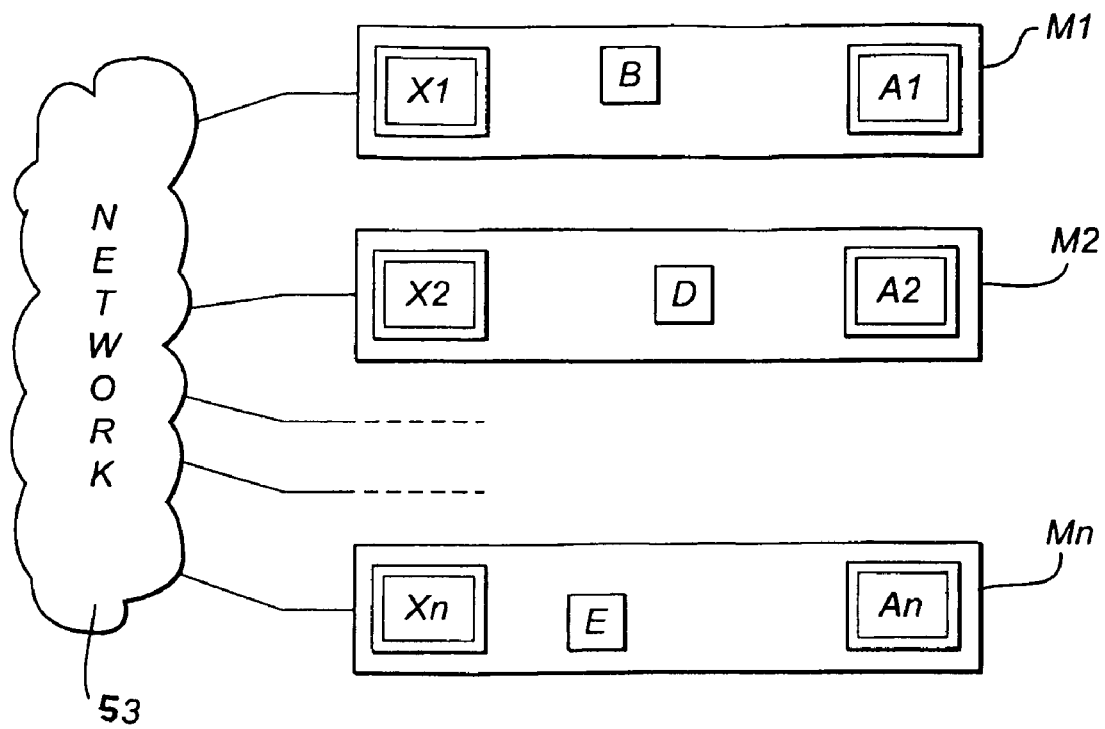
FIG. 6 is a map similar to FIG. 3 and showing memory location X no longer pointing to memory location A.
FIG. 7 is the single reachability table corresponding to FIG. 6.

Turning now to FIG. 6, in the execution of the application program 50, an assignment operation is executed by machine Mn in which the reference from class Xn to object An is overwritten with an empty or "null" reference. In this way, class Xn no longer points to object An. Corresponding to this operation, classes X1 and X2 on machines M1 and M2 are updated to no longer reference objects A1 and A2 respectively. This change is carried out by the server machine X in the case where it is present, or by the DRT 71/n of machine Mn in the case where server machine X is not present.

The situation after the changes illustrated in FIG. 6 is shown in the tables of FIGS. 7 and 8 respectively. However, as the three objects A1, A2 and An continue to exist, and continue to be accessible by the machines M1, M2 and Mn, there is no actual change. Thus the tables of FIGS. 7 and 8 are the same as the tables of FIGS. 4 and 5. Thus although class X no longer points to object A, any change to, say object A2, must be communicated to machines M1 and Mn to update objects A1 and An.

Figures 9, 10:
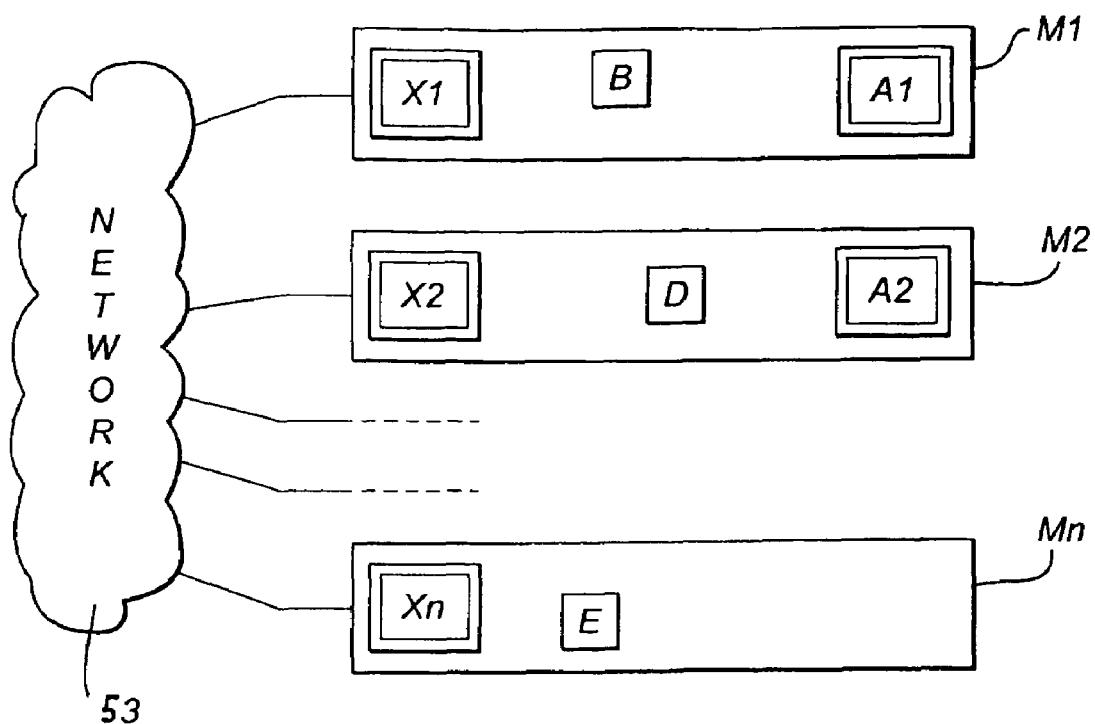
FIG. 9 is a memory map similar to FIGS. 3 and 6 showing the reclamation of one memory location, FIGS. 10 and 11 respectively illustrate the single and multiple reachability tables corresponding to the memory changes of FIG. 9.

FIG. 9 illustrates the position after the operating system of machine Mn, or the DRT 71/n, determines that object An is no longer needed on machine Mn. At this point machine Mn is free to reclaim the memory presently occupied by the local copy (An) of the object A. Such a system of memory reclamation is inherent in a computer and necessary to ensure that the local memory does not become cluttered with unused material. In addition, such a system operates in the background and thus programmers can rely upon unused objects, etc being cleaned up in due course. Therefore, no specific action needs to be taken by the programmer to delete or finalise unused objects.

When such a change takes place on machine Mn, the single reachability table of FIG. 10, or the reachability table for machine Mn in FIG. 11, is updated to indicate the object A is no longer accessible on machine Mn. Note that at this stage object A is still regarded as being shared because at least two machines, M1 and M2 in this example, are still able to access object A. Thus in FIG. 9 object A is still bounded by double lines. Thus any changes to A1 must be made to A2, and visa versa.

Figures 12, 13:
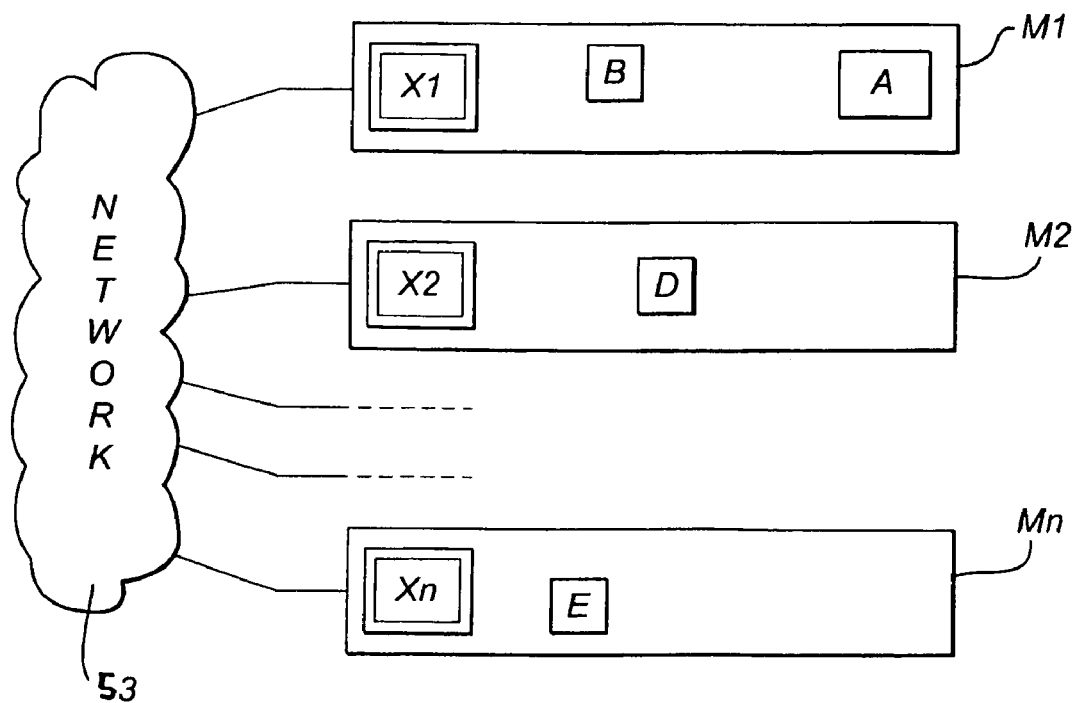
FIG. 12 illustrates another memory change, and FIGS. 13 and 14 respectively illustrate the single and multiple reachability tables corresponding to the memory changes of FIG. 12.

Turning now to FIG. 12, at this time, or at some later time, machine M2, say, determines that object A2 on machine M2 is no longer needed or utilised locally by machine M2. Thus the operating system of machine M2 or DRT 71/2 can execute an inherent procedure to reclaim the memory presently utilized by the local copy A2 of the global object A.

As a consequence, as illustrated in FIGS. 13 and 14, the reachability table(s) is/are modified so that object A is no longer recorded as being accessible by machine M2. As a result, object A is indicated in FIG. 12 as being bounded only by a single line. That is, only machine M1 can access object A (and so it can be referred to in FIG. 12 merely as A rather than A1—since the A1 terminology would imply that the copy on machine M1 of an object is also present on at least one other machine).

As a consequence, the reference to object A in the reachability table(s) can be deleted entirely, if desired. More importantly, changes to object A need not be communicated to any other machine, and if machine M1 no longer needs to make reference to object A then it can be deleted from machine M1 to reclaim the memory space previously occupied by object A.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the art that the reachability data enables structures, assets or resources (ie memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, unused memory locations can be quickly identified and reclaimed.

The foregoing describes only some embodiments of the present invention and modifications, obvious to those skilled in the art, can be made thereto without departing from the scope of the present invention. For example, the tables of FIGS. 4 and 7 each show a row corresponding to each memory location. In practice, for those memory locations such as D and E which are only accessible by their local machine, it is not necessary to have a row in the table at all. Instead, such a row is only created if the memory location becomes accessible by one or more other machines.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
 (i) re-compilation at loading,
 (ii) a pre-compilation procedure prior to loading,
 (iii) compilation prior to loading,
 (iv) "just-in-time" compilation(s), or
 (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

To summarise, there is provided a method of disabling a local memory clean-up procedure inherently present in each of a plurality of computers each with their corresponding independent local memory, each substantially simultaneously executing a corresponding different portion of an application program written to execute on only a single computer, and each being connected via a communications network to permit updating of corresponding memory locations, the method comprising the steps of:

(i) categorizing the memory locations of the local memories into a first reachability category in which the local memory locations are replicated on selected ones, or all, of the computers and therefore require updating via the communications network with changes to corresponding memory locations of the other computers having access to maintain substantial memory coherence, and into a second category in which the local memory locations are present only in the local computer and therefore no updating is required, (ii) permitting the inherent local memory clean-up procedure to operate unfettered in respect of the second category memory locations, (iii) disabling the inherent local memory clean-up procedure in respect of the first category memory locations, and (iv) demoting from the first category to the second category any of the first category memory locations unable to be referenced by any of the computers other than the local computer having the demotable first category memory location.

Preferably the method includes the further step of, (v) maintaining data regarding the memory locations categorization in a reachability table.

Preferably the method includes the further step of:

(vi) maintaining a single the reachability table. Preferably the method includes the step of:

(vii) maintaining the single reachability table on a server computer not forming one of the multiple computers and connected thereto via the communications network.

Alternatively the method includes the further step of:

(viii) maintaining a multiplicity of reachability tables, each on a corresponding one of the multiple computers.

Preferably the memory locations include an asset, structure or resource.

There is also provided a computer program product comprising a set of program instructions stored in a storage medium and operable to permit a plurality of computers to carry out any of the above method(s).

Furthermore there is provided a plurality of computers interconnected via a communications network and operable to ensure carrying out of any of the above method(s).

Also, there is provided a clean-up procedure modified multiple computer system in which a plurality of computers each has their corresponding independent local memory, each has an inherent local memory clean-up procedure, each substantially simultaneously executes a corresponding different portion of an application program written to execute on only a single computer, and each is connected via a communications network to permit updating of corresponding memory locations, the system including a reachability means to categorize memory locations of the local memories into a first category in which the local memory locations are replicated on selected ones, or all, of the computers and therefore require updating via the communications network with changes to corresponding memory locations of other computers to maintain substantial memory coherence, and into a second category in which the local memory locations are present only in the local computer and therefore no updating is required, and wherein the system includes a disabling means connected to the reachability means and to each of the plurality of computers to disable the inherent local memory clean-up procedure in respect of memory locations in the first category only, and the reachability means includes a demoting means to demote from the first category to the second category any of the first category memory locations unable to be referenced by any of the computers other than the local computer having the demotable first category memory location.

Preferably the reachability means comprises a reachability table in which is maintained data regarding the memory location classification.

Preferably there is included a server computer connected to the communications network, the server computer including a single reachability table.

Preferably each of the plurality of computers includes a corresponding reachability table.

Preferably the memory locations include an asset, structure or resource.

In addition, there is provided a single computer adapted to co-operate with at least one other computer in order to carry out any of the above method(s) or form the above computer system.

The term "compromising" (and its grammatical variations) as used herein is used in the inclusive sense of "having" or "including" and not in the exclusive sense of "consisting only of".

The invention claimed is:

1. A method of disabling a local memory clean-up procedure inherently present in each of a plurality of computers each with their corresponding independent local memory, each substantially simultaneously executing a corresponding different portion of an application program written to execute on only a single computer, and each being connected via a communications network to permit updating of corresponding memory locations, said method comprising the steps of:
(i) categorizing the memory locations of said local memories into a first reachability category in which the local memory locations are replicated on selected ones, or all, of said computers and therefore require updating via said communications network with changes to corresponding memory locations of the other computers having access to maintain substantial memory coherence, and into a second category in which the local memory locations are present only in the local computer and therefore no updating is required,
(ii) permitting said inherent local memory clean-up procedure to operate unfettered in respect of said second category memory locations,
(iii) disabling said inherent local memory clean-up procedure in respect of said first category memory locations, and
(iv) demoting from said first category to said second category any of said first category memory locations unable to be referenced by any of said computers other than the local computer having said demotable first category memory location.

2. The method as claimed in claim 1 including the further step of;

(v) maintaining data regarding said memory locations categorization in a reachability table.

3. The method as claimed in claim 2 including the further step of:
(vi) maintaining a single said reachability table.

4. The method as claimed in claim 3 including the step of:
(vii) maintaining the said single reachability table on a server computer not forming one of said multiple computers and connected thereto via said communications network.

5. The method as claimed in claim 2 including the further step of:
(viii) maintaining a multiplicity of reachability tables, each on a corresponding one of said multiple computers.

6. The method as claimed in claim 1 wherein said memory locations include an asset, structure or resource.

7. A computer program product comprising a set of program instructions stored in a storage medium and operable to permit a plurality of computers to carry out the method claimed in claim 1.

8. A plurality of computers interconnected via a communications network and operable to ensure carrying out of the method as claimed in claim 1.

9. A clean-up procedure modified multiple computer system in which a plurality of computers each has their corresponding independent local memory, each has an inherent local memory clean-up procedure, each substantially simultaneously executes a corresponding different portion of an application program written to execute on only a single computer, and each is connected via a communications network to permit updating of corresponding memory locations, said system including a reachability means to categorize memory locations of said local memories into a first category in which the local memory locations are replicated on selected ones, or all, of said computers and therefore require updating via said communications network with changes to corresponding memory locations of other computers to maintain substantial memory coherence, and into a second category in which the local memory locations are present only in the local computer and therefore no updating is required, and wherein said system includes a disabling means connected to said reachability means and to each of said plurality of computers to disable said inherent local memory clean-up procedure in respect of memory locations in said first category only, and said reachability means includes a demoting means to demote from said first category to said second category any of said first category memory locations unable to be referenced by any of said computers other than the local computer having said demotable first category memory location.

10. The system as claimed in claim 9 wherein said reachability means comprises a reachability table in which is maintained data regarding said memory location classification.

11. The system as claimed in claim 10 and including a server computer connected to said communications network, said server computer including a single reachability table.

12. The system as claimed in claim 10 wherein each of said plurality of computers includes a corresponding reachability table.

13. The system as claimed in claim 9 wherein said memory locations include an asset, structure or resource.

14. A single computer adapted to co-operate with at least one other computer in order to carry out the method as claimed in claim 1 or form the computer system as claimed in claim 9.

* * * * *